Patented Dec. 28, 1937

2,103,266

UNITED STATES PATENT OFFICE 2,103,266

ACYLATED DIOLS

William A. Lott, Newark, N. J., assignor to E. R. Squibb & Sons, New York, N. Y., a corporation of New York No Drawing. Application October 7, 1933, Serial No. 692,622

7 Claims. (Cl. 260—103)

This invention relates to, and has for its object the provision of, acylated diols of the general formula

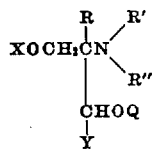

wherein X represents an aryl acyl or a substituted-aryl acyl, R represents hydrogen or an alkyl, R' represents hydrogen, an alkyl, or an aralkyl, R'' represents hydrogen, an alkyl, or an aralkyl, or R' and R'' jointly represent an alkylene, Q represents hydrogen or an alkyl, and Y represents an aryl or a substituted aryl; and the hydrochlorides thereof; especially where X stands for $C_6H_5NHCO$ or $C_6H_5CO$ or

wherein Z represents hydrogen or an alkyl.

Among the many acylated diols within the purview of the invention are those having the following formulas, and their hydrochlorides:

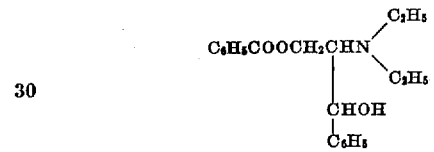

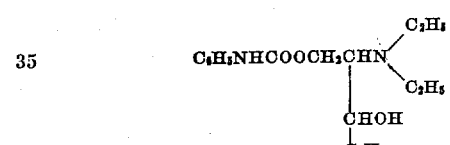

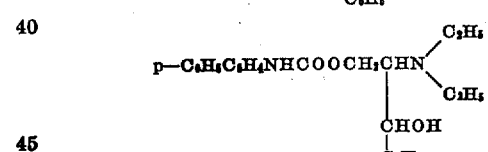

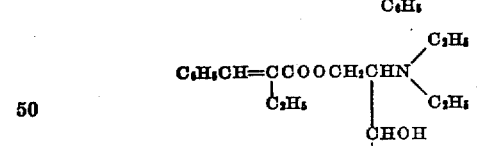

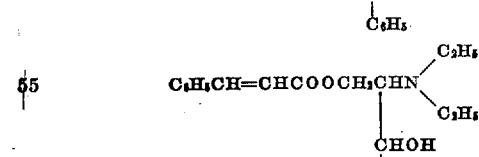

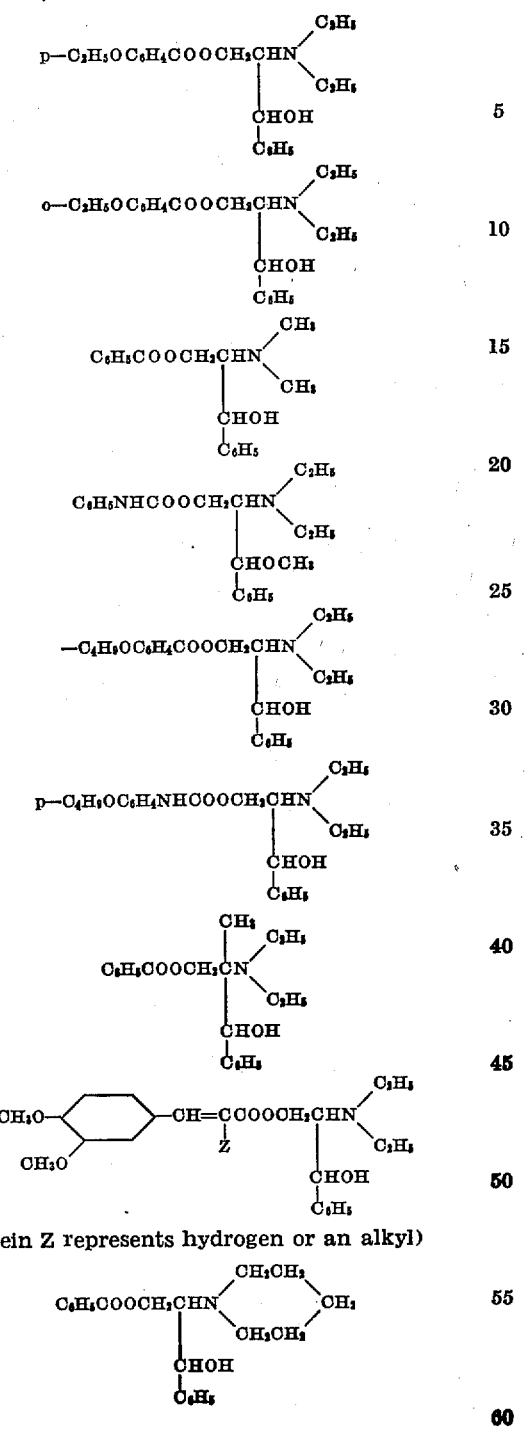

(wherein Z represents hydrogen or an alkyl)

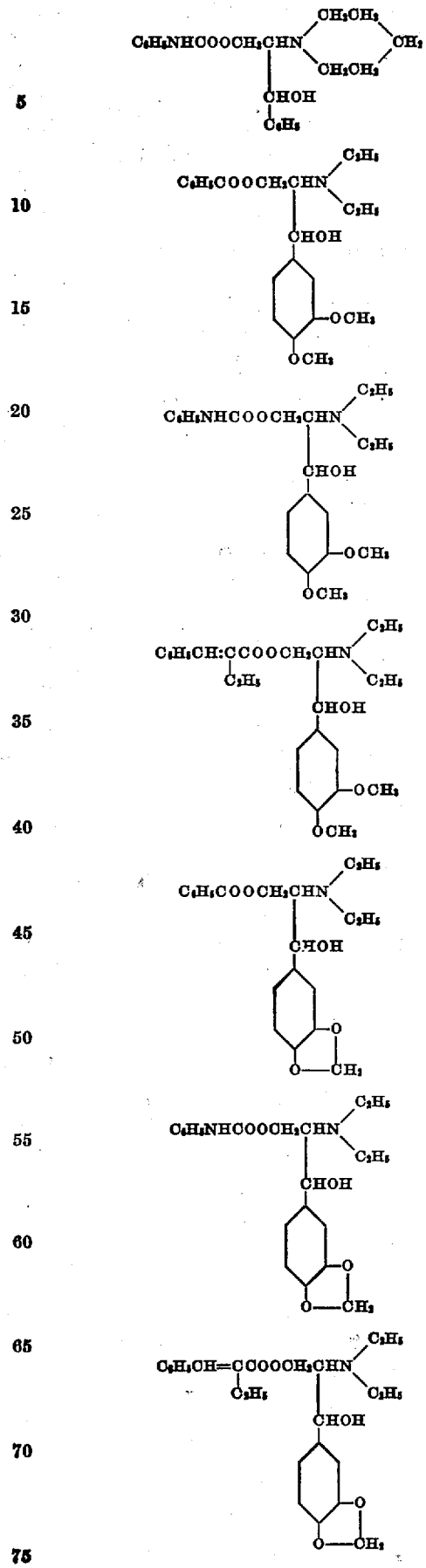

*Examples of preparation*

1. 1-phenyl 2-diethylamino 1,3-propanediol monobenzoate hydrochloride,

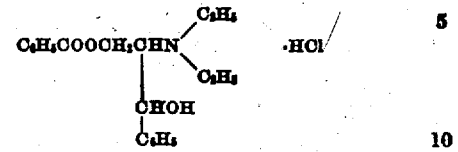

A. 33 g. of cinnamyl benzoate are dissolved in 150 cc. of alcohol-free water-saturated ether, a mixture of 23 g. of yellow mercury oxide and 39 g. of iodine is added in small portions, and the reaction mixture is slightly warmed and exposed to direct sunlight. Upon complete consumption of the iodine, the mixture of mercury oxide and mercuric iodide is removed by filtration; and the ether solution is washed with a 10% solution of potassium iodide to which a small amount of sodium bisulfite has been added, then with a 10% solution of sodium carbonate, and finally with water. The ether solution is dried with sodium sulfate and evaporated almost to dryness, and the residue (1-phenyl 2-iodo 1,3-propanediol monobenzoate), being in that condition unstable, is immediately dissolved in 100 cc. of absolute alcohol. To the solution 20 g. of diethylamine are added; the mixture is kept at room temperature in a closed container for thirty days and is then diluted with water to dissolve the excess diethylamine and its hydroiodide. The solution is extracted with ether, and the extract (which contains the free base of 1-phenyl 2-diethylamino 1,3-propanediol monobenzoate, a little diethylamine, and some nonbasic material) is now thoroughly dried with anhydrous sodium sulfate and anhydrous potassium carbonate in succession. A very small amount of alcoholic hydrogen chloride is added to remove the diethylamine as the hydrochloride. Addition of a larger quantity of alcoholic hydrogen chloride causes the 1-phenyl 2-diethylamino 1,3-propanediol monobenzoate hydrochloride to separate as an impure crystalline mass, which is removed before the addition of enough alcoholic hydrogen chloride to effect complete precipitation. Two recrystallizations from acetone yield about 6 g. of the compound sought, which is in the form of readily water-soluble white crystals having a melting point of 186–188.5° C.

B. A solution of 1 g. of 1-phenyl 2-diethylamino 1,3-propanediol in 10 cc. of anhydrous benzol is refluxed 2 hours with 0.7 g. of benzoyl chloride. Evaporation of the benzol and crystallization from acetone leaves about 0.5 g. of the compound sought, as water-soluble white crystals melting at about 176–178° C.

2. 1-phenyl 2-diethylamino 1,3-propanediol monocarbanilate hydrochloride,

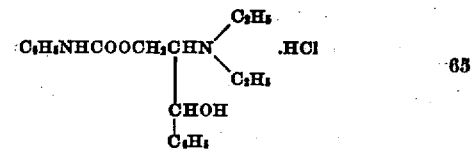

A solution of 20 g. of phenyl isocyanate in 75 cc. of dry benzol is added to a solution of 22 g. of cinnamyl alcohol in 75 cc. of dry benzol and the mixture is refluxed 5 hours. On concentration, crystallization of the product occurs; and it is recrystallized twice from absolute alcohol. There is obtained about 33 g. of cinnamyl phenyl urethane having a melting point of 92–93° C. 23 g. of the cinnamyl phenyl urethane are dissolved in 90 cc. of alcohol-free water-saturated ether; and, warmth and direct sunlight being provided, a mixture of 15 g. of powdered yellow mercury oxide and 28 g. of powdered iodine is added in small portions, each after discoloration of the iodine previously introduced. The ether solution is filtered and washed successively with 10% potassium iodide containing a small amount of sodium bisulfite, with sodium carbonate, and with water. After drying with sodium sulfate, the ether is evaporated off and the 1-phenyl 2-iodo 1,3-propanediol monocarbanilate are dissolved in 100 cc. of benzol. To the solution 25 g. of diethylamine are added, the mixture is kept at room temperature for two weeks and then extracted with dilute hydrochloric acid; the acidulated aqueous solution is alkalinized and extracted with ether; the free bases of the compound sought and of the diethylamine are evacuated several days to remove any diethylamine; and the thus-purified free base of the compound sought is dissolved in anhydrous ether and precipitated as the hydrochloride by the addition of anhydrous hydrogen chloride, an excess thereof being carefully avoided. The compound sought separates as a white powder that soon coalesces into a sticky mass, which on being heated at 105° C. for several hours and cooled can be ground into a water-soluble light-brown solid having no sharp melting point.

3. 1-phenyl 2-diethylamino 1,3-propanediol monoalphaethylcinnamate hydrochloride,

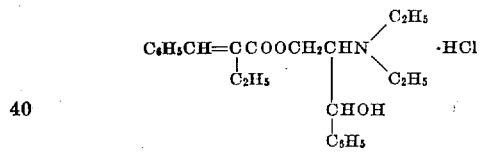

A solution of 4.4 g. (1.1 equivalents) of alpha-ethylcinnamyl chloride in 25 cc. of anhydrous ether is added to a solution of 4.6 g. of 1-phenyl 2-diethylamino 1,3-propanediol in 35 cc. of anhydrous ether and the mixture is refluxed 6 hours. On cooling overnight, the product crystallizes out. Recrystallization from a mixture of 1 part of absolute alcohol with 2 parts of absolute ether, yields about 3 g. of a product melting at 134–136° C. Further recrystallization from the same medium gives about 1 g. of the compound sought, as water-soluble white crystals having a melting point of 149–150° C.

4. 1-phenyl 2-diethylamino 1,3-propanediol mono-p-ethoxybenzoate hydrochloride,

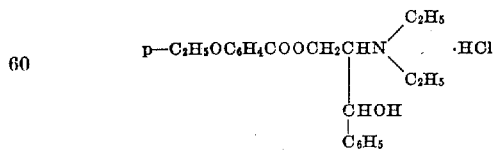

A solution of 5.5 g. of 1-phenyl 2-diethylamino 1,3-propanediol (boiling at 175–190°/13 mm.) is dissolved in 25 cc. of anhydrous benzol; a solution of 4.2 g. of p-ethoxy benzoyl chloride in 25 cc. of anhydrous benzol is added, and the mixture is refluxed for six hours on a steam bath; the benzol is distilled off; and on recrystallization of the residue from absolute alcohol the compound sought is obtained in the form of white crystals melting at 177–178° C. and readily yielding a 1% solution in water.

5. 1-phenyl 2-dimethylamino 1,3-propanediol monobenzoate hydrochloride,

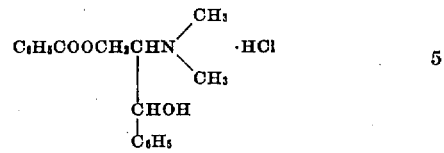

A solution of 2.71 g. of benzoyl chloride in 60 cc. of anhydrous ether is added to a solution of 3.9 g. of 1-phenyl 2-dimethylamino 1,3-propanediol in 25 cc. of anhydrous ether, and the mixture is refluxed for four hours; the compound sought separates in fine white crystals which, after recrystallization from acetone containing a small amount of alcohol, melt at 188–192° C.

6. 1-phenyl 1-methoxy 2-diethylamino 3-propanol carbanilate hydrochloride,

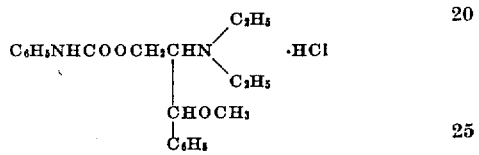

A solution of 9.3 g. of 1-phenyl 1-methoxy 2-diethylamino 3-propanol in 20 cc. of anhydrous ether is treated with a solution of 5.2 g. (a 10% excess) of phenyl isocyanate in 25 cc. of anhydrous ether, and the mixture is refluxed for four hours and allowed to stand two days at room temperature; upon filtration and addition of a slight excess of ethereal hydrogen chloride the compound sought is obtained as a viscous white mass which, when crystallized from absolute alcohol, yields white crystals melting at 198–199.5° C.

7. 1-phenyl 2-ethylamylamino 1,3-propanediol monobenzoate hydrochloride,

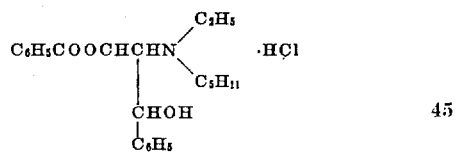

Process A of Example 1 may be followed precisely, except that 30 g. of ethylamylamine are added instead of 20 g. of diethylamine, and yields the compound sought, in the form of white crystals.

8. 1-phenyl 2-amino 1,3-propanediol monobenzoate

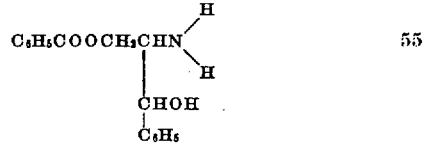

25 g. of cinnamyl benzoate are dissolved in 220 cc. of alcohol-free water-saturated ether in a 500-cc. 3-neck round-bottom flask fitted with a reflux condenser, a dropping funnel, and a mercury-sealed agitator. 23 g. of yellow mercury oxide are added, and then 18.5 g. of bromine dropwise during 45 minutes. Agitation is continued for 15 minutes thereafter and the solution is filtered. The filtrate is washed with 150 cc. of a 20% potassium iodide solution containing 1.5 g. of sodium bisulfite, and dried over anhydrous sodium sulfate. Most of the ether is removed by distillation, 25 cc. of absolute alcohol are added, and the remaining ether is distilled off. The alcohol solution being cooled, 7.2 g. of ammonia dissolved in absolute alcohol are added, and the mixture is heated in a sealed tube at 100° C. for 6 hours, during which a precipitate progressively forms. The reaction mixture is cooled, filtered, and evaporated to remove almost all the alcohol. On filtration and cooling of the residue, the compound sought crystallizes out, and, after recrystallization, is obtained in the form of fine white crystals melting at about 161–163° C.

Acylated diols of this invention have given evidence of great value as anesthetics, being characterized by suitable hydrion concentration, high activity, and comparative non-irritancy and non-destructiveness to tissue.

It is to be understood that the foregoing embodiments are merely illustrative and by no means limitative of the invention, which may assume various other forms—as with respect to the particular acylated diols and the reactants and procedures employed—within the scope of the appended claims.

I claim:
1. Compounds of the group having the general formula

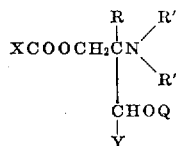

wherein X represents one of the radicals phenyl, alkoxy-phenyl, β-phenyl-vinyl, α-alkyl-β-phenyl-vinyl, α-alkyl β-dialkoxy-phenyl-vinyl, phenyl-amino, and alkoxy-phenyl-amino; R represents one of the class consisting of hydrogen and alkyl; R' and R'' represent one of the possibilities (a) R' is one of the class consisting of hydrogen, alkyl, and aralkyl and R'' is one of the class consisting of hydrogen, alkyl, and aralkyl, and (b) R' and R'' jointly are alkylene; Q represents one of the class consisting of hydrogen and alkyl; Y represents one of the radicals benzene aryl and dialkoxy- and alkylenedioxy-benzene aryl.

2. Acylated diols of the general formula

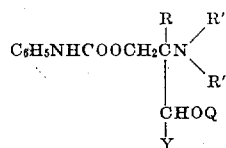

wherein R represents one of the class consisting of hydrogen and alkyl; R' and R'' represent one of the possibilities (a) R' is one of the class consisting of hydrogen, alkyl, and aralkyl, and R'' is one of the class consisting of hydrogen, alkyl, and aralkyl, and (b) R' and R'' jointly are alkylene; Q represents one of the class consisting of hydrogen and alkyl; Y represents one of the radicals benzene aryl and dialkoxy- and alkylenedioxy- benzene aryl.

3. Acylated diols of the general formula

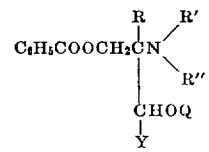

wherein R represents one of the class consisting of hydrogen and alkyl; R' and R'' represent one of the possibilities (a) R' is one of the class consisting of hydrogen, alkyl, and aralkyl, and R'' is one of the class consisting of hydrogen, alkyl, and aralkyl, and (b) R' and R'' jointly are alkylene; Q represents one of the class consisting of hydrogen and alkyl; Y represents one of the radicals benzene aryl and dialkoxy- and alkylenedioxy-benzene aryl.

4. Acylated diols of the general formula

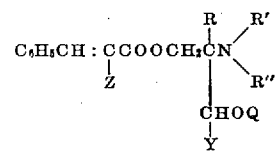

wherein R represents one of the class consisting of hydrogen and alkyl; R' and R'' represent one of the possibilities (a) R' is one of the class consisting of hydrogen, alkyl, and aralkyl, and R'' is one of the class consisting of hydrogen, alkyl, and aralkyl, and (b) R' and R'' jointly are alkylene; Q represents one of the class consisting of hydrogen and alkyl; Y represents one of the radicals benzene aryl and dialkoxy- and alkylenedioxy-benzene aryl; Z represents one of the class consisting of hydrogen and alkyl.

5. 1 - phenyl 2-diethylamino 1,3-propanediol monobenzoate hydrochloride.

6. 1 - phenyl 2 - diethylamino 1,3-propanediol monocarbanilate hydrochloride.

7. 1-phenyl 1-methoxy 2-diethylamino 3-propanol carbanilate hydrochloride.

WILLIAM A. LOTT.

CERTIFICATE OF CORRECTION.

Patent No. 2,103,266.                     December 28, 1937.

WILLIAM A. LOTT.

It is hereby certified that error appears in the printed specification of the above numbered patent requiring correction as follows: Page 1, second column, lines 26 to 32 inclusive, at the beginning of the formula, before "-C$_4$" insert the letter p; and that the said Letters Patent should be read with this correction therein that the same may conform to the record of the case in the Patent Office.

Signed and sealed this 27th day of September, A. D. 1938.

Henry Van Arsdale (Seal)                                    Acting Commissioner of Patents.

dissolved in absolute alcohol are added, and the mixture is heated in a sealed tube at 100° C. for 6 hours, during which a precipitate progressively forms. The reaction mixture is cooled, filtered, and evaporated to remove almost all the alcohol. On filtration and cooling of the residue, the compound sought crystallizes out, and, after recrystallization, is obtained in the form of fine white crystals melting at about 161–163° C.

Acylated diols of this invention have given evidence of great value as anesthetics, being characterized by suitable hydrion concentration, high activity, and comparative non-irritancy and non-destructiveness to tissue.

It is to be understood that the foregoing embodiments are merely illustrative and by no means limitative of the invention, which may assume various other forms—as with respect to the particular acylated diols and the reactants and procedures employed—within the scope of the appended claims.

I claim:

1. Compounds of the group having the general formula

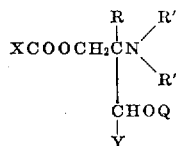

wherein X represents one of the radicals phenyl, alkoxy-phenyl, β-phenyl-vinyl, α-alkyl-β-phenyl-vinyl, α-alkyl β-dialkoxy-phenyl-vinyl, phenyl-amino, and alkoxy-phenyl-amino; R represents one of the class consisting of hydrogen and alkyl; R' and R" represent one of the possibilities (a) R' is one of the class consisting of hydrogen, alkyl, and aralkyl and R" is one of the class consisting of hydrogen, alkyl, and aralkyl, and (b) R' and R" jointly are alkylene; Q represents one of the class consisting of hydrogen and alkyl; Y represents one of the radicals benzene aryl and dialkoxy- and alkylenedioxy-benzene aryl.

2. Acylated diols of the general formula

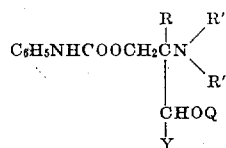

wherein R represents one of the class consisting of hydrogen and alkyl; R' and R" represent one of the possibilities (a) R' is one of the class consisting of hydrogen, alkyl, and aralkyl, and R" is one of the class consisting of hydrogen, alkyl, and aralkyl, and (b) R' and R" jointly are alkylene; Q represents one of the class consisting of hydrogen and alkyl; Y represents one of the radicals benzene aryl and dialkoxy- and alkylenedioxy- benzene aryl.

3. Acylated diols of the general formula

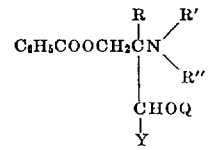

wherein R represents one of the class consisting of hydrogen and alkyl; R' and R" represent one of the possibilities (a) R' is one of the class consisting of hydrogen, alkyl, and aralkyl, and R" is one of the class consisting of hydrogen, alkyl, and aralkyl, and (b) R' and R" jointly are alkylene; Q represents one of the class consisting of hydrogen and alkyl; Y represents one of the radicals benzene aryl and dialkoxy- and alkylenedioxy-benzene aryl.

4. Acylated diols of the general formula

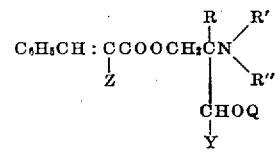

wherein R represents one of the class consisting of hydrogen and alkyl; R' and R" represent one of the possibilities (a) R' is one of the class consisting of hydrogen, alkyl, and aralkyl, and R" is one of the class consisting of hydrogen, alkyl, and aralkyl, and (b) R' and R" jointly are alkylene; Q represents one of the class consisting of hydrogen and alkyl; Y represents one of the radicals benzene aryl and dialkoxy- and alkylenedioxy-benzene aryl; Z represents one of the class consisting of hydrogen and alkyl.

5. 1-phenyl 2-diethylamino 1,3-propanediol monobenzoate hydrochloride.

6. 1-phenyl 2-diethylamino 1,3-propanediol monocarbanilate hydrochloride.

7. 1-phenyl 1-methoxy 2-diethylamino 3-propanol carbanilate hydrochloride.

WILLIAM A. LOTT.

---

CERTIFICATE OF CORRECTION.

Patent No. 2,103,266.    December 28, 1937.

WILLIAM A. LOTT.

It is hereby certified that error appears in the printed specification of the above numbered patent requiring correction as follows: Page 1, second column, lines 26 to 32 inclusive, at the beginning of the formula, before "-C₄" insert the letter p; and that the said Letters Patent should be read with this correction therein that the same may conform to the record of the case in the Patent Office.

Signed and sealed this 27th day of September, A. D. 1938.

Henry Van Arsdale (Seal)    Acting Commissioner of Patents.

CERTIFICATE OF CORRECTION.

Patent No. 2,103,266. December 28, 1937.

WILLIAM A. LOTT.

It is hereby certified that error appears in the printed specification of the above numbered patent requiring correction as follows: Page 1, second column, lines 26 to 32 inclusive, at the beginning of the formula, before "$-C_4$" insert the letter p; and that the said Letters Patent should be read with this correction therein that the same may conform to the record of the case in the Patent Office.

Signed and sealed this 27th day of September, A. D. 1938.

Henry Van Arsdale (Seal) Acting Commissioner of Patents.